United States Patent [19]

Wagner et al.

[11] 4,265,929
[45] May 5, 1981

[54] SINGLE-BAKE TWO-LAYER ENAMELLING WITH ELECTROSTATIC POWDER COATING

[75] Inventors: Gebhard Wagner, Odenthal; Werner Joseph, Cologne, both of Fed. Rep. of Germany

[73] Assignee: Bayer Aktiengesellschaft, Leverkusen, Fed. Rep. of Germany

[21] Appl. No.: 96,368

[22] Filed: Nov. 21, 1979

Related U.S. Application Data

[63] Continuation of Ser. No. 936,990, Aug. 25, 1979, abandoned.

[30] Foreign Application Priority Data

Sep. 17, 1977 [DE] Fed. Rep. of Germany ....... 2741971

[51] Int. Cl.$^3$ ............................................. B05D 1/06
[52] U.S. Cl. ........................................ 427/33; 427/193; 427/201; 427/204; 427/205; 427/376.5; 427/419.4
[58] Field of Search ................... 427/27, 33, 193, 201, 427/202, 204, 205, 376.2, 376.4, 376.5, 402, 419.4

[56] References Cited

U.S. PATENT DOCUMENTS

| | | | |
|---|---|---|---|
| 3,930,062 | 12/1975 | Nedeljkovic | 427/27 |
| 4,104,416 | 8/1978 | Parthasarathy et al. | 427/27 |
| 4,110,487 | 8/1978 | Rion | 427/27 |

*Primary Examiner*—John H. Newsome
*Attorney, Agent, or Firm*—Sprung, Felfe, Horn, Lynch & Kramer

[57] ABSTRACT

In a two-layer enamelling process in which the ground coat and surface coat powders are electrostatically applied to metallic substrates and subsequently baked together, the improvement which comprises employing a ground coat powder having an electrical resistivity of about $10^{10}$ to $10^{14}$ ohm. cm and a surface coat powder having an electrical resistivity of about $10^{14}$ to $10^{16}$ ohm. cm. Advantageously the surface tension of the ground coat amounts to at least about 0.280 N/m and the surface tension of the surface coat to at most about 0.260 N/m, the difference between the surface tensions of the ground coat and surface amounts to at least about 0.050 N/m, the ground coat powder has an electrical resistivity $10^{12}$ to $10^{14}$ ohm. cm and at least about $10^2$ ohm. cm lower than that of the surface coat powder, the ground coat powder contains at least one of an alkaline earth metal, zinc, manganese or iron oxide in a total concentration of about 20 to 30% by weight, the zinc oxide content not exceeding about 12% by weight and the manganese oxide plus iron oxide content not exceeding about 9% by weight, about 3 to 5% by weight of finely divided iron oxide is added to the ground coat powder before adjustment of its electrical resistivity, and the ground coat powder is applied in such a quantity that, after baking, the ground coat has a layer thickness of about 0.02 to 0.03 mm.

6 Claims, No Drawings

SINGLE-BAKE TWO-LAYER ENAMELLING WITH ELECTROSTATIC POWDER COATING

This is a continuation of application Ser. No. 936,990, filed Aug. 25, 1979, now abandoned.

This invention relates to an enamelling process with porcelain enamel powder coating, particularly for two-layer enamelling, by electrostatically spraying ground-coat and surface-coat powders, followed by common baking.

Cold-rolled, enamellable steel plate having a carbon content of up to 0.2% is normally enamelled with ground-coat and surface-coat frits, each coat being individually baked.

By contrast, direct enamelling with enamels free from adhesive oxides, such as titanium-opacified enamels for example, requires selected and/or decarburized steels and elaborate pretreatments of the workpieces with nickel plating of the steel surface.

Carbon-containing steels are still being used at the present time for sanitary ware, cooking utensils and storage water heaters by virtue of their strength, their deep-drawing properties and their thickness in sheet form. Articles of the type in question are conventionally enamelled with ground and surface coats, each layer of enamel slip being dried and individually baked after it has been applied to the metallic workpiece.

There has been no shortage of attempts to improve the economy of the enamelling process and to dispense with one bake by successively applying the ground and surface coats and baking both layers together. Thus, in some known processes, the ground coat slip is impregnated with organosilicon compounds which enables the surface coat to be subsequently applied to the no longer absorbent ground coat.

The technically advanced electrostatic application of enamel frits in powder form has been made possible by pretreatment of the enamel powders in accordance with German Pat. No. 2,538,601 with materials which react with silanol groups present at the surface of the enamel powders, as a result of which the electrical resistivity of the enamel frits is increased from about $10^6$ ohm.cm to more than $10^{12}$ ohm.cm. In electrostatic powder coating, electrically charged enamel frit particles follow the electrical field lines, provision having to be made to ensure that, after the particles have reached the metallic workpiece, the electrical charge is released only slowly and under control to the grounded workpiece so that adequate adhesion of the powder to the metallic workpiece and within the enamel powder layer is obtained.

Another effect of the pretreatment is that, even in the event of mechanical stressing during its application and also during and after recovery, the enamel powder remains fluid, i.e. fluidizable in an air cushion and, hence, conveyable by an air stream, without any change in the necessary resistivity, even in a moist atmosphere.

The electrostatic application of titanium white enamel powders pretreated in this way to decarburized steel sheets pretreated for direct white enamelling has been carried out on a commercial scale for some time. Attempts successively to apply ground-coat and surface-coat powders pretreated in this way electrostatically to the metallic workpiece, followed by common baking, failed to produce satisfactory enamelling. For example, black spots appeared in the surface coat. In addition, increases in the thickness of the powder layers occurred particularly at the corners and edges of the workpiece, causing the enamel layer applied to foam. Moreover, the powder layer was found to contain crater-like depressions attributable to electrostatic repulsion of the powder particles bearing similar charges. Owing to these faults, it was no longer possible to obtain smooth, satisfactory enamelling.

It has surprisingly been found that these disadvantages can be obviated by adjusting the electrical resistivity of the ground-coat powder to a value of about $10^{10}$ to $10^{14}$ ohm.cm and preferably about $10^{12}$ to $10^{14}$ ohm.cm, and the electrical resistivity of the surface-coat powder to a value of about $10^{14}$ to $10^{16}$ ohm.cm.

This is all the more surprising insofar as, hitherto, the objective has been to obtain as high an electrical resistivity as possible in enamel powders intended for electrostatic application in order to achieve a high degree of deposition of the enamel powder on the workpiece to be coated and favorable flow properties of the powders, coupled with a high resistance to ageing, even in moist air and under mechanical stressing.

Accordingly, the present invention provides a two-layer enamelling process in which the ground-coat and surface-coat powders are electrostatically applied to metallic substrates and which is characterised in that the ground-coat powder is adjusted to an electrical resistivity of from $10^{10}$ to $10^{14}$ ohm.cm, preferably from $10^{12}$ to $10^{14}$ ohm.cm, whilst the surface-coat powder is adjusted to an electrical resistivity of from $10^{14}$ to $10^{16}$ ohm. cm.

The electrical resistivity is adjusted in accordance with the teaching of the above-mentioned German Offenlegungsschrift No. 2,538,601.

The different electrical resistivities of the ground-coat and surface-coat powders, which preferably differ by at least about $10^2$ ohm.cm in their electrical resistivity, can be obtained by suitably selecting the pretreatment agents and controlling the degree of charging of the particles with the pretreatment agent, these parameters being respectively determined by preliminary tests.

It has also also been found that high-quality ground and surface coating can be obtained in a single bake by using ground and surface coats which preferably differ by at least about 0.05 N/m in their surface tension, ground coats having a surface tension of at least about 0.28 N/m and surface coats having a surface tension of at most about 0.26 N/m at the baking temperature being used in accordance with the invention.

The surface tension of the enamel frits can be determined in known manner by the weighted thread method (G. Jaeckel, Glastechn. Ber. 12 (1934) 414).

In the present state of the enamelling art, the boundary between the two enamel layers in conventional two layer enamelling, in which the ground coat and the surface coat are individually based, is relatively clear-cut. If, however, the ground coat and surface coat are baked together, it is virtually impossible to avoid diffusion reactions between the two enamel layers—promoted by the evolution of gas and the dissolution in the enamel layer of the iron oxide which forms on the surface of the steel. In general, diffusion reactions such as these result in unstable enamelling, in many cases of unsatisfactory quality.

It has surprisingly been found that these undesirable diffusion reactions can be reduced by using grund-coat frits having a content of oxides of the alkaline earth metals, zinc, manganese and iron, of about 20 to 40% by weight and preferably about 20 to 30% by weight, their zinc oxide content not exceeding about 12% by weight and their manganese oxide and iron oxide content each not exceeding about 9% by weight.

It has also been found that an addition of about 1 to 10% by weight, preferably about 3 to 5% by weight, of iron oxide pigment to the ground coat powder further reduces these diffusion reactions between the ground coat and surface coat and favorably influences the surface quality of the enamel coating.

It has been found that the particularly preferred ground coat powders for electrostatic application for single-bake two-layer enamelling with the above-mentioned properties, such as a resistivity of from $10^{10}$ to $10^{14}$ ohm.cm and preferably from $10^{12}$ to $10^{14}$ ohm.cm, a surface tension of at least 0.28 N/m and the above-described diffusion-inhibiting properties of the ground coat, are surprisingly able, even in layer thicknesses of about 0.01 to 0.04 mm, preferably about 0.02 to 0.03 mm (as measured after baking), to meet all the requirements which are generally satisfied by ground coats applied in slip form in layer thicknesses above about 0.08 mm.

Of these properties, particular reference is made to wetting of the substrate, dissolution of the oxides formed during baking and adhesion of the enamel layer to the substrate.

According to the invention, it is preferred to use ground-coat frits having the following approximate composition:

| | | |
|---|---|---|
| $SiO_2$ | 27–35% | by weight |
| $B_2O_3$ | 15–20% | by weight |
| $Al_2O_3$ | 0–7% | by weight |
| alkali metal oxides | 12–20% | by weight |
| alkaline-earth metal oxides | 15–25% | by weight |
| $Fe_2O_3$ | 0–9% | by weight |
| ZnO | 0–12% | by weight |
| MnO | 0–9% | by weight |
| F | 1–6% | by weight |
| adhesive oxides (NiO, CoO, CuO) | 1–4% | by weight |

Where the ground coats according to the invention are used, there is no longer any need for the pretreatment of the steel sheets by nickel plating which is generally necessary in conventional thin-layer enamelling for improving adhesion of the enamel and avoiding enamelling faults, because the adhesion of the ground coat powders or ground coat/surface coat powder combinations according to the invention to non-nickel-plated steel sheets is better than or at least comparable with their adhesion to nickel-plated steel sheets.

The strong adhesion remains intact even in the event of repeated baking, for example for decorating the enamel layer with transfer patterns or by screen printing.

In addition, the ground coat powders or ground coat/surface coat powder combinations according to the invention produce a high-quality enamel coating with good adhesion, even on poorly degreased, unpickled steel sheets with carbon contents of up to about 0.2%, so that the frequency of defects during industrial processing is greatly reduced.

The invention is illustrated by the following Examples:

EXAMPLE 1

1 kg of a ground coat of the following composition:

| | |
|---|---|
| $SiO_2$ | 33% by weight |
| $B_2O_3$ | 18% by weight |
| $Al_2O_3$ | 3% by weight |
| alkali metal oxides | 15% by weight |
| alkaline earth metal oxides | 20% by weight |
| $Fe_2O_3$ | 2% by weight |
| ZnO | 3% by weight |
| NiO | 1% by weight |
| CoO | 1% by weight |
| F | 4% by weight | with a surface tension of 0.295 N/m, was ground with 2 g of diphenyl silane diol and 2 g of hexamethyl disilazane in a porcelain ball mill until the residue on a 60 μm mesh sieve amounted to 3%. The powder thus obtained had an electrical resistivity of $2 \times 10^{13}$ ohm.cm.

In another porcelain ball mill, 1 kg of a titanium white enamel of the following composition:

| | |
|---|---|
| $SiO_2$ | 45% by weight |
| $B_2O_3$ | 18% by weight |
| alkali metal oxides | 15% by weight |
| $TiO_2$ | 18% by weight |
| $P_2O_5$ | 2% by weight |
| MgO | 1% by weight |
| F | 2% by weight | with a surface tension of 0.225 N/m, was ground with 4 g of methyl hydrogen siloxane having a viscosity of 30 mPas (=30 millipascal seconds=30 c poises) until the residue on a 60 μm mesh sieve amounted to 5%. The resulting powder had an electrical resistivity of $8 \times 10^{15}$ ohm.cm.

The air-fluidised ground coat powder was conveyed by an air stream to an electrostatic powder spray gun to whose corona electrodes a voltage of 90 KV was applied. 3 g of enamel powder were thus applied to one side of a steel plate measuring 20×20 cm which had been pretreated in the usual way for enamelling. This quantity corresponded to a layer thickness of 0.025 mm after baking.

Thereafter 12 g of the white enamel powder were applied by a spray gun of the same type, corresponding to a layer thickness of 0.1 mm after baking.

Both enamels were then baked for 4 minutes at 820° C. in a muffle furnace.

The enamelled surface was fault-free and smooth. The adhesion was good.

EXAMPLE 2

In a porcelain ball mill, 1 kg of a ground coat of the following composition:

| | |
|---|---|
| $SiO_2$ | 31% by weight |
| $B_2O_3$ | 17% by weight |
| $Al_2O_3$ | 4% by weight |
| alkali metal oxides | 14% by weight |
| alkaline earth metal oxides | 18% by weight |
| $Fe_2O_3$ | 6% by weight |
| MnO | 3% by weight |
| CoO | 1% by weight |
| CuO | 1% by weight |
| F | 5% by weight | with a surface tension of 0.280 N/m, was ground with 1 g of diphenyl silane diol, 1 g of hexamethyl disilazane and 3 g of methyl hydrogen siloxane having a viscosity of 30 mPas until the residue on a 60 μm mesh sieve amounted to 3%. The powder thus obtained had an electrical resistivity of $8 \times 10^{13}$ ohm.cm.

In another porcelain ball mill, 1 kg of a pastel-colored titanium enamel of the following composition:

|  |  |
|---|---|
| SiO$_2$ | 42% by weight |
| B$_2$O$_3$ | 17% by weight |
| Al$_2$O$_3$ | 3% by weight |
| alkali metal oxides | 17% by weight |
| TiO$_2$ | 15% by weight |
| P$_2$O$_5$ | 1% by weight |
| MgO | 1% by weight |
| CuO | 2% by weight |
| F | 2% by weight | with a surface tension of 0.220 N/m, was ground with 4 g of methyl hydrogen siloxane having a viscosity of 30 mPas until the residue on a 60 μm mesh sieve amounted to 5%. The resulting powder had an electrical resistivity of $5 \times 10^{15}$ ohm.cm.

4 g of the ground coat powder were applied to one side of a steel plate measuring 20×20 cm, which had been pretreated in the usual way for enamelling, by means of an electrostatic powder spray gun, to whose corona electrode a voltage of 90 KV was applied. This quantity of 4 g corresponded to a layer thickness of 0.032 mm after baking.

15 g of the colored enamel powder were then applied by a spray gun of the same type, this quantity of 15 g corresponding to a layer thickness of 0.14 mm after baking.

Both enamels were then baked for 4 minutes at 820° C. in a muffle furnace.

The enamelled surface was fault-free and smooth. The adhesion was good.

EXAMPLE 3

In a porcelain ball mill, 1 kg of a round coat of the following composition:

|  |  |
|---|---|
| SiO$_2$ | 29% by weight |
| B$_2$O$_3$ | 17% by weight |
| Al$_2$O$_3$ | 5% by weight |
| alkali metal oxides | 14% by weight |
| alkaline earth metal oxides | 16% by weight |
| Fe$_2$O$_3$ | 9% by weight |
| MnO | 2% by weight |
| ZnO | 2% by weight |
| NiO | 1% by weight |
| CoO | 1% by weight |
| CuO | 1% by weight |
| F | 3% by weight | with a surface tension of 0.305 N/m was ground with 2 g of diphenyl silane diol and 1 g of methyl hydrogen siloxane having a viscosity of 30 mPas until the residue on a 60 μm mesh sieve amounted to 3%. The powder thus obtained had an electrical resistivity of $6 \times 10^{12}$ ohm.cm.

In another porcelain ball mill, 1 kg of a titanium white enamel of the following composition:

|  |  |
|---|---|
| SiO$_2$ | 42% by weight |
| B$_2$O$_3$ | 18% by weight |
| alkali metal oxides | 17% by weight |
| TiO$_2$ | 18% by weight |
| P$_2$O$_5$ | 2% by weight |
| MgO | 1% by weight |
| F | 2% by weight | with a surface tension of 0.225 N/m was ground with 4 g of methyl hydrogen siloxane having a viscosity of 30 mPas until the residue on a 60 μm mesh sieve amounted to 5%. The resulting powder had an electrical resistivity of $8 \times 10^{15}$ ohm.cm.

2 g of the ground coat powder were applied to one side of steel plate measuring 20×20 cm, which had been pretreated in the usual way for enamelling, by means of an electrostatic powder spray gun, to whose corona electrode a voltage of 90 KV was applied. This quantity of 2 g corresponded to a layer thickness of 0.017 mm after baking.

11 g of the white enamel powder were then applied by a spray gun of the same type, this quantity of 11 g corresponding to a layer thickness of 0.10 mm after baking.

Both enamels were then stoved for 4 minutes at 820° C. in muffle furnace.

The enamelled surface was fault-free and smooth. The adhesion was good.

EXAMPLE 4

In a porcelain ball mill, 1 kg of a ground coat of the following composition:

|  |  |
|---|---|
| SiO$_2$ | 33% by weight |
| B$_2$O$_3$ | 18% by weight |
| Al$_2$O$_3$ | 3% by weight |
| alkali metal oxides | 15% by weight |
| alkaline earth metal oxides | 20% by weight |
| Fe$_2$O$_3$ | 2% by weight |
| ZnO | 3% by weight |
| NiO | 1% by weight |
| CoO | 1% by weight |
| F | 4% by weight | with a surface tension of 0.295 N/m was ground with 50 g of iron oxide pigment (Fe$_2$O$_3$), 2 g diphenyl silane diol and 2 g of hexamethyl disilazane until the residue on a 60 μm mesh sieve amounted to 3%. The powder thus obtained had an electrical resistivity of $2 \times 10^{13}$ ohm.cm.

In another porcelain ball mill, 1 kg of a transparent enamel of the following composition:

|  |  |
|---|---|
| SiO$_2$ | 53% by weight |
| B$_2$O$_3$ | 14% by weight |
| alkali metal oxides | 18% by weight |
| TiO$_2$ | 8% by weight |
| Al$_2$O$_3$ | 3% by weight |
| CaO | 2% by weight |
| F | 2% by weight | with a surface tension of 0.240 N/m was ground with 30 g of cadmium sulphoselenide red pigment and 4 g of methyl hydrogen siloxane having a viscosity of 30 mPas until the residue on a 60 μm mesh sieve amounted to 4%. The resulting powder had an electrical resistivity of $3 \times 10^{15}$ ohm.cm.

3 g of the ground coat powder were applied to one side of a steel plate measuring 20×20 cm, which had been pretreated in the usual way for enamelling, by means of an electrostatic powder spray gun, to whose corona electrode a voltage of 90 KV was applied. This quantity of 3 g corresponded to a layer thickness of 0.025 mm after baking.

15 g of the transparent enamel powder with pigment were then applied by a spray gun of the same type, this quantity of 15 g corresponding to a layer thickness of 14 mm after baking.

Both enamels were then stoved for 4 minutes at 820° C. in a muffle furnace.

The enamelled surface was fault-free and smooth. The adhesion was good.

It will be appreciated that the instant specification and examples are set forth by way of illustration and not limitation, and that various modifications and changes may be made without departing from the spirit and scope of the present invention.

What is claimed is:

1. In a two-layer enamelling process in which the ground coat and surface powders are electrostatically applied to metallic substrates and subsequently baked together, the improvement which comprises employing a ground coat powder having an electrical resistivity of about $10^{10}$ to $10^{14}$ ohm.cm and a surface coat powder having an electrical resistivity of about $10^{14}$ to $10^{16}$ ohm.cm and at least $10^2$ ohm.cm higher than the ground coat.

2. A process as claimed in claim 1, wherein the surface tension of the ground coat amounts to at least about 0.280 N/m and the surface tension of the surface coat to at most about 0.260 N/m, the difference between the surface tensions of the ground coat and surface coat amounting to at least about 0.050 N/m.

3. A process as claimed in claim 1, wherein the ground coat powder contains at least one of an alkaline earth metal, zinc, manganese or iron oxide in a total concentration of about 20 to 40% by weight, the zinc oxide content not exceeding about 12% by weight and the manganese oxide and iron oxide content each not exceeding about 9% by weight.

4. A process as claimed in claim 1, wherein about 1 to 10% by weight of finely divided iron oxide is added to the ground coat powder before adjustment of its electrical resistivity.

5. A process as claimed in claim 1, wherein the ground coat powder is applied in such a quantity that, after baking, the ground coat has a layer thickness of about 0.01 to 0.04 mm.

6. A process as claimed in claim 2, wherein the ground coat powder has an electrical resistivity of about $10^{12}$ to $10^{14}$ ohm.cm, the ground coat powder contains at least one of an alkaline earth metal, zinc, manganese or iron oxide in a total concentration of about 20 to 30% by weight, the zinc oxide content not exceeding about 12% by weight and the manganese oxide and iron oxide content each not exceeding about 9% by weight, about 3 to 5% by weight of finely divided iron oxide is added to the ground coat powder before adjustment of its electrical resistivity, and the ground coat powder is applied in such a quantity that, after baking, the ground coat has a layer thickness of about 0.02 to 0.03 mm.

* * * * *